United States Patent [19]

Alard et al.

[11] 4,190,624

[45] Feb. 26, 1980

[54] PROCESS FOR THE EXTRUSION OF COMPOSITIONS BASED ON ALPHA-OLEFIN POLYMERS

[75] Inventors: Joseph Alard, Andenne; Jean-Louis Derroitte, Mormont, both of Belgium

[73] Assignee: Solvay & Cie., Brussels, Belgium

[21] Appl. No.: 912,071

[22] Filed: Jun. 5, 1978

[30] Foreign Application Priority Data

Jun. 7, 1977 [FR] France .............................. 77 17978

[51] Int. Cl.² ............................................ B29D 7/20
[52] U.S. Cl. .................................. 264/146; 260/42.46; 260/45.8 R; 264/178 F; 264/178 R; 264/211; 525/2
[58] Field of Search ............... 264/148, 178 F, 178 R, 264/211, 145, 146; 260/42.46, 45.8 R; 526/2

[56] References Cited

U.S. PATENT DOCUMENTS

| | | | |
|---|---|---|---|
| 2,941,254 | 6/1960 | Swerlick | 264/178 R |
| 2,985,617 | 5/1961 | Salyer et al. | 260/45.7 R |
| 2,991,264 | 7/1961 | Monroe, Jr. et al. | 260/32.6 |
| 3,039,993 | 6/1962 | Friedman | 260/45.8 R |
| 3,580,735 | 5/1971 | Shimodoi et al. | 264/211 |
| 3,922,249 | 11/1975 | Mills | 526/2 |

*Primary Examiner*—Jeffrey R. Thurlow
*Attorney, Agent, or Firm*—Spencer & Kaye

[57] ABSTRACT

Process for the extrusion, followed by cooling with water, of compositions based on alpha-olefin polymers. The composition being extruded comprises a phenolic anti-oxidizing agent, an organic phosphite, and a carbonate of an alkaline-earth metal. The process permits fabricating films, filaments and tubes.

11 Claims, No Drawings

PROCESS FOR THE EXTRUSION OF COMPOSITIONS BASED ON ALPHA-OLEFIN POLYMERS

BACKGROUND OF THE INVENTION

The present invention concerns a process for the extrusion of compositions based on alpha-olefin polymers. It concerns more particularly a process for the fabrication of objects, by extrusion followed by cooling with water, of alpha-olefin compositions, preferably based on propylene polymers.

Alpha-olefin polymers, in particular polymers of lower alpha-monoolefins such as ethylene and propylene, are thermoplastic polymers adaptable to being formed by extrusion. An important market for this transformation process resides in the fabrication of films, sheets, tubes and filaments. In the particular case of propylene polymers, a large volume of these extrudable polymers is destined for the fabrication of fibers and films. These latters can, for example, be utilized, as is, as packaging films, can be cut into strips for weaving, or can even be fibrillated for various textile uses.

Very often, the extrusion proper of the polymer is followed by an abrupt cooling treatment (hardening) of the extruded objects by means of water. Thus, extruded filaments generally pass, at the outlet of the spinneret, into a hardening tank containing water. Extruded sheets can be cooled by spraying with water after their calendering. Extruded tubes are often cooled by immersion in a water bath.

As regards films, it is known that they can be fabricated by methods called "blown film" and "flat spinneret." According to this latter, the film issuing from the spinneret is cooled by cylinders provided with internal fluid circulation ("chill roll") or by a water bath. The abrupt cooling obtained by this latter method makes it preferred for obtaining clear films. This method is very valuable for the fabrication of textiles for technical uses (weaving, rope manufacture, string or twine manufacture...), for which the film must be cut into strips.

In all of the above processes, carried out continuously and implying a cooling or hardening of the extruded objects by a water bath, there is presented the problem of entrainment, by the extruded object, during the course of its advance, of more or less significant quantities of cooling water. This entrainment often becomes apparent already in connection with low extrusion speeds. The presence of this water is particularly annoying for the performance of the subsequent operations which the objects to be formed are required to undergo.

Thus, films and filaments generally undergo a stretching for the purpose of increasing their strength. Moreover, the films can be cut into strips before stretching. The presence of water disturbs this stretching and occasions frequent breaks in these filaments and strips.

Moreover, entrainment of the cooling water by extruded sheets or tubes leads to surface defects in the former and provokes an irregular shrinking and heterogeneous composition of the latter.

Numerous attempts have already been made to remedy these drawbacks. They primarily reside in a search for additives which suppress or at least reduce, the entrainment of water by objects extruded from compositions based on polyolefins, but they have never led to entirely satisfactory results. It has not been possible, in effect, to reduce in this manner the entrainment of water by objects extruded at high speed, without harming other essential properties of these objects, such as stability, coloration and anti-corrosive action.

SUMMARY OF THE INVENITON

It has now been found, in accordance with the present invention, that certain compositions based on alpha-olefin polymers permit fabricating objects by extrusion followed by cooling with water, without this latter being entrained, even for extrusion speeds higher than 12 meters per minute, and without harming other essential properties of the extruded objects.

The present invention provides a process for the extrusion of compositions based on alpha-olefin polymers, followed by a cooling of the extruded material with water, according to which the composition being extruded comprises at least one phenolic anti-oxidant; at least one organic phosphite; and at least one carbonate of an alkaline-earth metal.

It is to be understood that both the foregoing general description and the following detailed description are exemplary, but are not restrictive of the invention.

DETAILED DESCRIPTION OF THE INVENTION

The alpha-olefin polymers entering into the compositions usable according to the present invention are polymers containing at least 50% molar and preferably at least 75% molar of olefins having terminal unsaturation, the molecule of which contains 2 to 18 and preferably 2 to 6 carbon atoms, such as ethylene, propylene, butene-1, pentene-1, methylbutenes-1, hexene-1, 3- and 4- methylpentenes-1 and vinylcyclohexane. They can more particularly be polymers containing tertiary carbon atoms such as the strongly isotactic crystalline polymers of butene-1, of 4-methylpentene-1, and particularly of propylene.

They can equally be copolymers of these alpha-olefins with one another and/or with diolefins comprising 4 to 18 carbon atoms, such as unconjugated aliphatic diolefins as, for example, 1,4-hexadiene or such as alicyclic diolefins having an endocyclic bridge like dicyclopentadiene, for example.

Finally, they can be copolymers of the type known as "block" copolymers which comprise successions of chain sections of variable lengths, each section being constituted by a homopolymer of an alpha-olefin or of a statistical copolymer comprising alpha-olefin and at least one comonomer selected from among the alpha-olefins and the diolefins.

The best results are obtained with polymers containing at least 50% by weight and preferably at least 75% by weight of propylene.

The compositions usable according to the present invention can also be based on mixtures of two or several polymers such as described above.

The polymers which are usable can be prepared according to known methods of polymerization of alpha-olefins at low pressure. In particular, strongly isotactic crystalline homopolymers of propylene can be prepared in the presence of stereospecific catalytic systems based on organometallic compounds and titanium chlorides having a valence lower than their maximum valence.

The compositions usable according to the present invention comprise at least one constituent (a) which is any phenolic anti-oxidant. This anti-oxidant can be selected advantageously from the group of alkylated mono-, poly- and thiobis-phenols.

As examples of alkylated monophenols, there can be mentioned 2,6-di-tert-butyl-p-cresol and (3,5-di-tert-butyl-4-hydroxyphenol) propionate of n-octa-decyl.

As examples of alkylated thiobisphenols, there can be mentioned 4,4'-thiobis-6-tert-butyl-m-cresol and 4,4'-thiobis-6-tert-butyl-o-cresol.

As examples of alkylated polyphenols, there can be mentioned tetrakis [methylene(3,5-di-tert-butyl-4-hydroxy) dihydrocinnamate] methane, terephthalate of 2,2'-methylene bis (3-methyl-7-tert-butylphenol), and 2,6-bis-(2'-hydroxy-3-tert-butyl-S'-methyl-benzyl)-4-methylphenol and isocyanurate of tris-(3,5-di-tert-butyl-4-hydroxy)benzyl.

The compositions usable according to the invention can equally comprise a mixture of the phenolic anti-oxidants enumerated above.

The compositions usable according to the present invention comprise at least one constituent (b) which is an organic phosphite. The incorporation of this constituent (b) has for its principal result to increase the effectiveness of the phenolic anti-oxidants mentioned above. This organic phosphite is advantageously selected from among the phosphites and thiophosphites of the general formulas $(RO)_3P$ and $(RS)_3P$ in which the radicals R, identical or different, represent an alkyl, aryl, alkyaryl, cycloalkyl, or alkoxyalkyl radical, and from among the cyclic phosphites derived from pentaerythritol.

Examples of organic phosphites conforming to these definitions are disclosed in U.S. Pat. No. 3,039,993 issued to Weston Chemical.

The phosphites preferred as constituents (b) are, on the one hand, trialkylphosphites such as triethyl-,tributyl- and trinonylphosphites for example, and on the other hand, diphosphites of dialkylpentaerythritol, such as the diphosphite of distearylpentaerythritol for example. Mixtures of these phosphites can equally be advantageously used.

The extrudable compositions being extruded according to the present invention finally comprise at least one constituent (c) which is a carbonate of an alkaline-earth metal. All of the alkaline-earth metal carbonates are suitable as constituents (c). There can be mentioned, for example, carbonates of magnesium, calcium, strontium and barium. It is preferred, however, to utilize calcium carbonate, and in particular calcium carbonates present in the form of particles having an average diameter below 10 microns. Calcium carbonates known as "precipitated", that is, calcium carbonates obtained by carbonation of a milk of lime, are very suitable.

It has in effect been noted with surprise that the incorporation of these carbonates into the compositions being extruded according to the present invention reduces in the most effective manner the entrainment of water by the objects extruded starting from these compositions.

There can equally be incorporated into the compositions mixtures of the carbonates defined above.

Constituents (a) and (b) are incorporated into the compositions extruded according to the present invention in the usual stabilizing quantities. These quantities are generally between 0.005 and 10% by weight of the polymer entering into the composition, and preferably between 0.01 and 5%. More particularly, these quantities are of the order of 0.05 to 0.5%.

Constituent (c) is incorporated into the compositions in a proportion of around 0.1 to 50 per mil by weight of the polymer, preferably in a proportion of 0.1 to 10 per mil.

The best results are obtained with quantities of constituent (c) around 0.2 to 0.3 per mil.

To be able to incorporate easily, and in a homogeneous manner, this latter constituent (c) into the compositions being extruded according to the present invention, it is preferred that the average diameter of these particles be a fraction of a micron. More particularly, the particles of constituent (c) have an average diameter of between 0.05 and 0.8 micron. It has been noted in effect that if the size of the particles of constituent (c) is higher, this leads, in the case of extrusion of films cut into strips, to a rapid wearing of the cutting blades.

In addition to the polymer and constituents (a), (b) and (c), the compositions usable according to the present invention can contain other customary additives such as, for example, other anti-oxidants such as the thioesters generally derived from thiodipropionic acid, other polymers, process facilitating agents, strengthening agents, pigments, fillers, lubricants, anti-static agents, etc.

Constituents (a), (b) and (c) can be incorporated into the polymer in any manner known per se, for example, by dry mixing or even by impregnating the polymer in the form of powder or granules by means of a solution of constituents in an appropriate solvent, alone or in combination with other ingredients, or even by mixing a solution or a suspension of the polymer with a solution of the constituents.

The incorporation can be effected, for example, either in a mixer or a grinder where the solvent is evaporated, or by malaxation on heated cylinders or by extrusion of a mixture of the polymer with the other constituents.

The extrusion of the compositions according to the present invention can be effectuated according to any conventional techniques known to those skilled in the art.

The characteristics of the apparatus will obviously be selected as a function of the transformation to which it is desired to subject the composition to be extruded and of the type of object which it is intended to form.

As to the treatment of cooling or hardening by means of water, it is effectuated at a temperature which depends on the nature of the extruded object and the properties which it is intended to impart to this latter. For example, in the case of extrusion, starting from compositions based on polymers of propylene, of films intended to be cut into strips, the temperature of the hardening bath for the primary film is generally between about 20° and about 50° C.

The process according to the present invention thus imparts an elegant solution to the problem of water entrainment, by extruded compositions, when these latters are cooled with water. In addition, the utilization, in the extrusion process forming the object of the present invention, of the compositions described above, permits, in a surprising manner, to assure an excellent compromise between the suppression of the water entrainment even at high extrusion speed, the initial coloration and the anti-corrosion effectiveness, a compromise which is not achieved with the compositions of the prior art. In addition, the preferred compositions according to the present invention containing "precipitated" calcium carbonate in particles of an average diameter of the order of a fraction of a micron, do not soil the spinneret of the extruder, and during extrusion of films which are cut into strips, they do not provoke a premature wearing of the cutting knives.

The invention is illustrated by the illustrative and non limiting examples herebelow.

EXAMPLE 1

An extrudable composition is prepared by dry mixing of the following constituents:

1000 parts by weight of a crystalline homopolymer of propylene;

0.3 part by weight of terephthalate of 2,2'-methylene-bis (4-methyl-6-tertbutylphenol) sold under the designation HPM 12 by Organosynthese;

0.2 part by weight of diphosphite of distearylpentaerythritol sold under the mark WESTON 618 by Borg-Warner;

1 parts by weight of trinonylphosphite sold by Rhone-Poulenc; and 0.3 part by weight of "precipitated" calcium carbonate sold under the mark SOCAL U1 by Solvay.

This granulated composition is then extruded in the form of a film of around 100 microns thickness. This film is cooled by passage in a bath of water at ambient temperature (25° C.) and then cut into strips which are stretched, at a stretching rate of around 1/6 in a stretching oven brought to a temperature of 150°–180° C.

It is noted that these strips do not entrain water, even when the extrusion speed of the primary film reaches 40 m/min.

In addition, their cutting does not lead to a premature wearing of the knives. Finally, it is noted that the extruded compositions do not corrode the processing apparatus.

EXAMPLE 2

An extrudable composition is prepared as in Example 1, except that there is used:

1 part by weight of (3,5-di-tert-butyl-4-hydroxyphenyl) propionate of n-octa-decyl sold under the designation Irganox 1076 by Ciba-Geigy, in place of the HPM 12; and 0.2 part by weight of SOCAL U1, instead of 0.3 part by weight of SOCAL U1.

This composition is transformed into strips as indicated in Example 1. These strips exhibit the same properties as those noted for the strips of Example 1.

EXAMPLE 3

An extrudable composition is prepared as in Example 1, except that there is used, in place of the additives listed in Example 1, the following additives which are added to the polymer of propylene;

0.25 part by weight of tetrakis [methylene(3,5-di-tert-butyl-4-hydroxy)dihydrocinnamate] methane sold under the designation Irganox 1010 by Ciba-Geigy;

0.75 part by weight of Irganox 1076;

1.5 parts by weight of trinonylphosphite;

0.2 part by weight of SOCAL U1.

Once again there is observed, for the strips obtained in the manner described in Example 1, the same advantageous properties.

EXAMPLE 4

This example is given for purposes of comparison.

An extrudable composition is prepared as in Example 1, except that the SOCAL U1 is replaced by 0.5 part by weight of calcium stearate. When strips are fabricated in the manner described in Example 1, starting from these compositions, the phenomenon of entrainment of water is already present at extrusion speeds as low as 12 m/min.

It will be understood that the above description of the present invention is susceptible to various modifications, changes and adaptations, and the same are intended to be comprehended within the meaning and range of equivalents of the appended claims.

We claim:

1. Process for the extrusion of a composition based on an alpha-olefin polymer, followed by a cooling with water of the extruded material, comprising: extruding an alpha-olefin composition which comprises stabilizing amounts of (a) at least one phenolic anti-oxidant and (b) at least one organic phosphite; and (c) at least one carbonate of an alkaline-earth metal in an amount effective to reduce the entrainment of water by the extruded material.

2. Process according to claim 1, wherein the alpha-olefin polymer is a polymer of propylene.

3. Process according to claim 1 wherein the phenolic anti-oxidant is selected from the alkylated mono-, poly- and thiobis- phenols.

4. Process according to claim 1 wherein the organic phosphite is selected from the trialkyl-phosphites and diphosphites of dialkylpentaerythritol.

5. Process according to claim 1, wherein the carbonate of alkaline-earth metal is calcium carbonate.

6. Process according to claim 5, wherein the calcium carbonate is in the form of particles whose average diameter is less than 10 microns.

7. Process according to claim 1, wherein the carbonate of alkaline-earth metal is incorporated into the composition in a proportion of 0.1 to 10 per mil by weight of the polymer.

8. Process according to claim 1, wherein the carbonate of alkaline-earth metal is in the form of particles of an average diameter of between 0.05 and 0.8 microns.

9. Process according to claim 1, wherein it is applied to the fabrication of films.

10. Process according to claim 9, wherein the films are cut into strips.

11. Process according to claim 1, wherein the carbonate of alkaline-earth metal is incorporated into the composition in a proportion of 0.2 to 0.3 per mil by weight of the polymer.

* * * * *